US012403839B2

(12) United States Patent
Hawkins et al.

(10) Patent No.: US 12,403,839 B2
(45) Date of Patent: Sep. 2, 2025

(54) METHOD OF FORMING A ONE-PIECE VEHICLE ROOF RAIL

(71) Applicant: LACKS ENTERPRISES, INC., Grand Rapids, MI (US)

(72) Inventors: Thomas Hawkins, Spring Lake, MI (US); Paul Nikandrou, Caledonia, MI (US); Ryan Lacks, Grand Rapids, MI (US); Nick Hrnyak, Grand Rapids, MI (US)

(73) Assignee: LACKS ENTERPRISES, INC.

( * ) Notice: Subject to any disclaimer, the term of this patent is extended or adjusted under 35 U.S.C. 154(b) by 0 days.

(21) Appl. No.: 18/427,994

(22) Filed: Jan. 31, 2024

(65) Prior Publication Data
US 2024/0217444 A1 Jul. 4, 2024

Related U.S. Application Data

(63) Continuation of application No. 16/896,739, filed on Jun. 9, 2020, now Pat. No. 11,945,408, which is a continuation of application No. 15/932,220, filed on Feb. 16, 2018.

(60) Provisional application No. 62/459,862, filed on Feb. 16, 2017.

(51) Int. Cl.
*B60R 9/04* (2006.01)
*B29C 45/16* (2006.01)
*B29C 45/17* (2006.01)
*B29C 45/37* (2006.01)
*B29C 48/13* (2019.01)
*B29C 48/154* (2019.01)
*B29C 48/16* (2019.01)
*B29C 48/18* (2019.01)
*B29C 45/00* (2006.01)
*B29K 105/04* (2006.01)
*B29L 31/30* (2006.01)

(52) U.S. Cl.
CPC ............ *B60R 9/04* (2013.01); *B29C 45/1642* (2013.01); *B29C 45/1704* (2013.01); *B29C 45/37* (2013.01); *B29C 48/13* (2019.02); *B29C 48/154* (2019.02); *B29C 48/16* (2019.02); *B29C 48/18* (2019.02); *B29C 2045/0043* (2013.01); *B29C 2045/172* (2013.01); *B29K 2105/04* (2013.01); *B29L 2031/30* (2013.01); *B29L 2031/3005* (2013.01)

(58) Field of Classification Search
CPC .............................. B29C 45/1635; B60R 9/04
See application file for complete search history.

(56) References Cited

U.S. PATENT DOCUMENTS 3,451,602 A    6/1969  Bott
4,123,488 A    10/1978 Lawson
4,838,467 A    6/1989  Bott et al.
(Continued)

FOREIGN PATENT DOCUMENTS

CN    202518188 U    11/2012
CN    105857196 A    8/2016
(Continued)

*Primary Examiner* — Benjamin A Schiffman
(74) *Attorney, Agent, or Firm* — Dickinson Wright PLLC

(57) ABSTRACT

A roof rail for a vehicle is provided that is made of only one piece and is solid across its length. The roof rail may be made using a co-injection molding process, a two-shot injection molding process or an extrusion molding process.

15 Claims, 5 Drawing Sheets

(56) References Cited

U.S. PATENT DOCUMENTS

| | | | |
|---|---|---|---|
| 5,560,666 | A | 10/1996 | Vieira et al. |
| 5,765,737 | A | 6/1998 | Cucheran et al. |
| 6,338,428 | B1 | 1/2002 | Kawasaki et al. |
| 7,070,725 | B2 | 7/2006 | Mathew et al. |
| 8,449,018 | B2 | 5/2013 | Grgae et al. |
| 10,479,009 | B2 | 11/2019 | Birka et al. |
| 11,142,130 | B2 * | 10/2021 | Lacks ................... B62D 25/06 |
| 11,299,103 | B2 * | 4/2022 | Hawkins ................. B60R 9/04 |
| 11,685,316 | B2 * | 6/2023 | Hawkins ................. B60R 9/04 |
| | | | 224/326 |
| 11,872,959 | B2 * | 1/2024 | Wojtczak ................ B60R 9/04 |
| 2002/0011506 | A1 | 1/2002 | Shingu et al. |
| 2007/0252409 | A1 | 11/2007 | Clinton et al. |
| 2008/0210725 | A1 | 9/2008 | Birtwisle et al. |
| 2009/0145941 | A1 | 6/2009 | Kiyota |
| 2010/0304065 | A1 | 12/2010 | Tomantschger et al. |
| 2020/0023783 | A1 | 1/2020 | Jung et al. |

FOREIGN PATENT DOCUMENTS

| | | | |
|---|---|---|---|
| DE | 10048138 | A1 | 5/2001 |
| DE | 10249447 | A1 | 5/2003 |
| DE | 102011017470 | A1 | 10/2012 |
| FR | 2794702 | A1 | 12/2000 |
| GB | 827053 | A | 2/1960 |
| GB | 2117723 | A | 10/1983 |
| JP | 09226469 | A | 9/1997 |
| JP | 1035366 | A | 2/1998 |
| JP | 1067283 | A | 3/1998 |
| JP | 10129357 | A | 5/1998 |
| JP | 10315262 | A | 12/1998 |
| JP | 2000103293 | A | 4/2000 |

\* cited by examiner

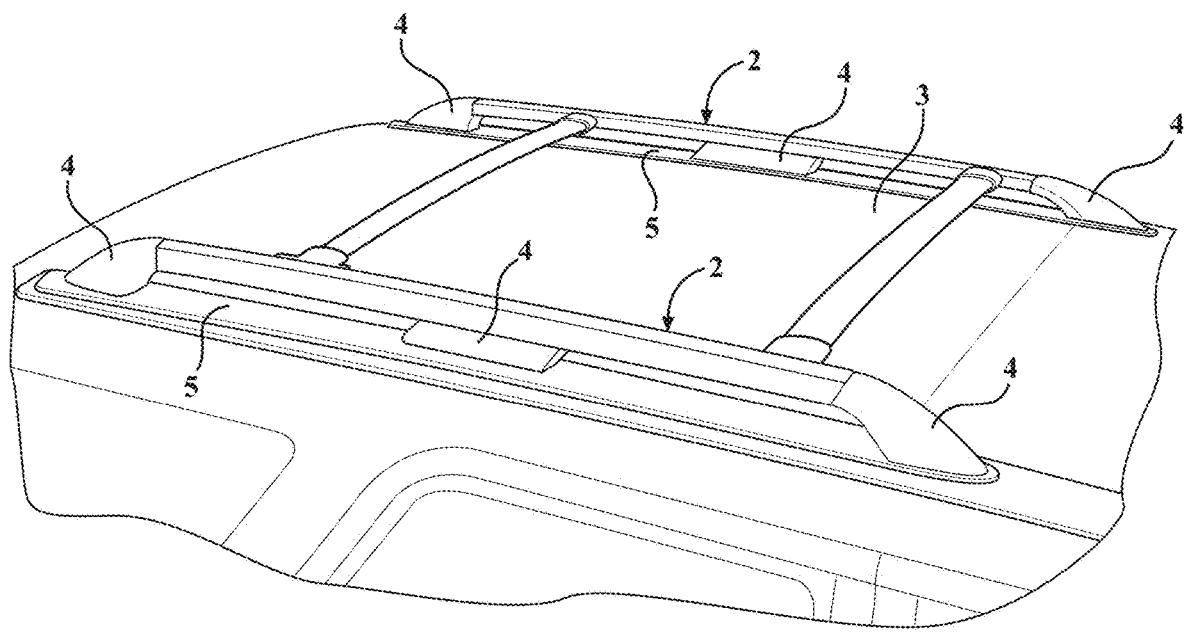
FIG. 1 - Prior Art

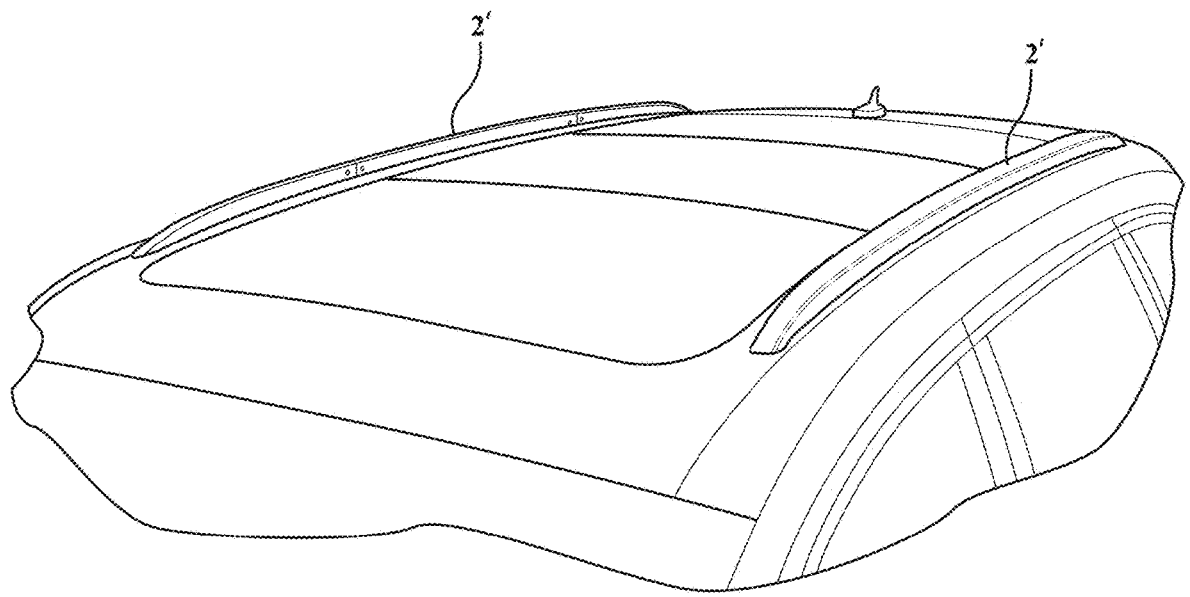
FIG. 2 - Prior Art
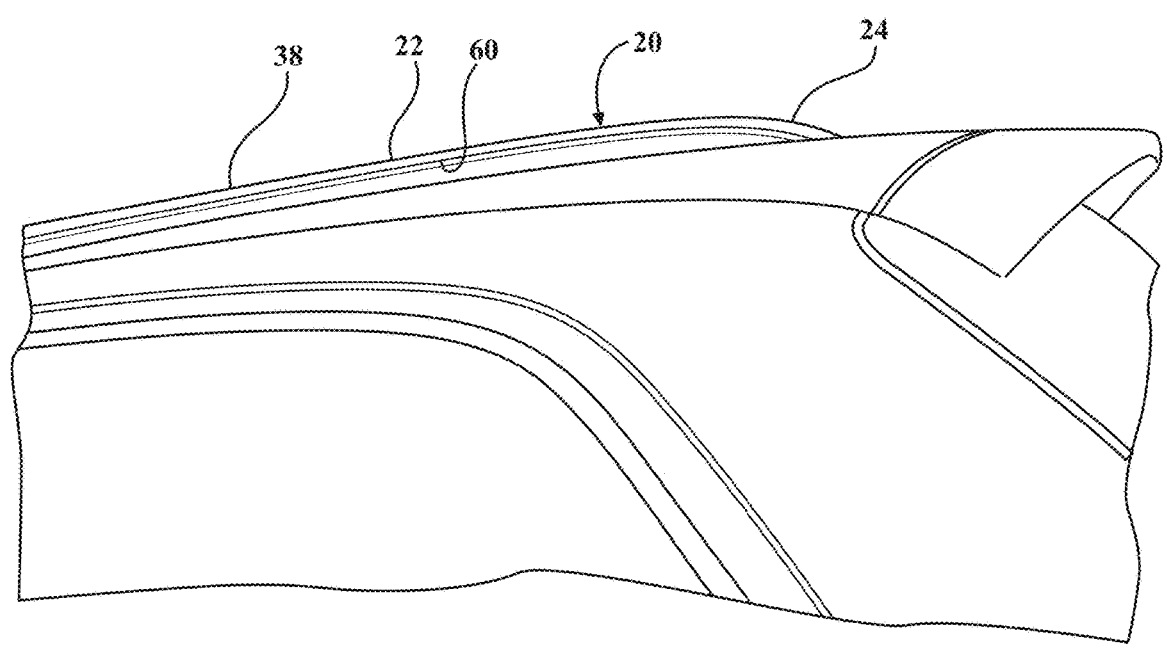
FIG. 3

METHOD OF FORMING A ONE-PIECE VEHICLE ROOF RAIL

CROSS-REFERENCE TO RELATED APPLICATIONS

This application is a continuation application of U.S. Utility patent application Ser. No. 16/896,739, filed on Jun. 9, 2020, which is a continuation application of U.S. Utility patent application Ser. No. 15/932,220 filed on Feb. 16, 2018, which claims the benefit of U.S. Provisional Patent Application Ser. No. 62/459,862 filed on Feb. 16, 2017, and titled "One-Piece Automotive Roof Rail," the entire disclosures of which are hereby incorporated by reference.

TECHNICAL FIELD

A roof rail for a roof rack assembly of a vehicle. More particularly, a roof rail that is solid and comprised of only a single piece across its length.

BACKGROUND OF THE DISCLOSURE

Many automobiles include a roof rack assembly mounted along a roof for storing or transporting items. As best presented in FIG. 1, typically, the roof rack assembly includes a pair of roof rails 2, or luggage rails, that extend along respective sides of the roof 3 in spaced and relatively parallel relationship with one another. Conventional roof rails 2 are typically comprised of multiple components that are separately molded of plastic or other materials and attached to one another. For example, as shown in FIG. 1, each rail 2 is spaced from the roof 3 of the vehicle by plastic or metal supports 4 that are attached to aluminum or steel rails 5. Known issues with such conventional roof rails 2 are that they can have unsightly seam lines at connection points between the components, the components can squeak or rattle relative to one another during movement of the vehicle, and assembly of the roof rail 2 can be complex and expensive. Furthermore, it is known that components of the roof rail 2 such as covers may become looser or even completely fly off the vehicle during movement of the vehicle.

Furthermore, "flush-mount" roof rail designs, such as that shown in FIG. 2, are known which have no gap between the roof rail 2' and roof 3. It is known to make such flush mounted roof rails 2' utilizing a process known as stretch bending, in which a hollow aluminum extrusion is formed to a shape. It is known for such extruded stretch-bent aluminum flush-mount rails 2' to have a bright dip anodized finish. However, given the complexity and cost of extruding, bending, machining, polishing or brushing, anodizing or painting, and the resultant scrap associated with all those steps as well as handling damage, stretch bent aluminum designs and the associated manufacturing processes can be expensive. One issue with the process of manufacturing stretch-bent aluminum rails 2' is that it involves many steps and often includes substantial variations because aluminum changes over time from the beginning of the process until it is anodized. Because aluminum builds its own aluminum oxide layer over time, material that is not processed in a timely manner will have a different output in terms of finished appearance compared to material processed timely. Another drawback of aluminum is that it is a soft material which can easily be scratched or damaged. This leads to in-process scrap at manufacturing facilities and customer dissatisfaction.

Another design option for roof rails is a large injection molded cover attached to a structural flush-mount base rail. This design can offer similar styling to stretch-bent aluminum, but it is difficult to shape.

In view of the foregoing, there remains a need for improvements to roof rails.

SUMMARY OF THE DISCLOSURE

It is an aspect of the present disclosure to provide a roof rail assembly that is aesthetically pleasing and functional while minimizing the risks and drawbacks of conventional roof rails.

It is another aspect of the disclosure to provide a roof rail with an aesthetically pleasing appearance with no undesired seam lines or gaps between components on the exposed surface.

It is another aspect of the disclosure to provide a one piece roof rail that is cost effective and easy to assemble due to having few components and a simple construction.

It is another aspect of the disclosure to provide a roof rail that is not prone to making noise or failing during operation of the vehicle.

It is another aspect of the disclosure to provide a one piece roof rail that is made of lightweight materials, thus providing reduced weight of the vehicle.

According to an aspect of the disclosure, a method of forming a roof rail for a vehicle is provided. The method includes injection molding, with a thermoplastic material, an elongated main body portion extending between a pair of ends, and a pair of connecting portions each at one of the ends of the main body portion. The main body portion and the connecting portions are integral with one another.

According to another aspect of the disclosure, another method of forming a roof rail for a vehicle is provided. The method includes extruding a thermoplastic material into an elongated main body portion extending between a pair of ends, and a pair of connecting portions each at one of the ends of the main body portion. The main body portion and the connecting portions are integral with one another.

According to yet another aspect of the disclosure, a method of forming a roof rail for a vehicle is provided. The method includes molding an inner portion of an elongated main body portion with a first thermoplastic material and an outer portion of the elongated main body portion with a second thermoplastic material. The elongated main body portion extends between a pair of ends. A pair of connecting portions are each located at one of the ends. The main body portion and the connecting portions are integral with one another.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 1 is a perspective view of a prior art roof rack assembly for a vehicle including roof rails that are spaced from the roof of the vehicle by supports;

FIG. 2 is a perspective view of a prior art roof rack assembly that has a pair of rails that are flush mounted to a roof of the vehicle and constructed with a "stretch bending" process;

FIG. 3 is a perspective view of a roof rack assembly including an example embodiment of a roof rail according to an aspect of the disclosure, wherein the roof rail includes a character line formed thereon;

DESCRIPTION OF THE ENABLING EMBODIMENT

Detailed aspects of the present disclosure are provided herein; however, it is to be understood that the disclosed aspects are merely exemplary and may be embodied in various and alternative forms. It is not intended that these aspects illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations. Additionally, the features and various implementing embodiments may be combined to form further examples of the disclosure.

Referring to the Figures, wherein like numerals indicate corresponding parts throughout the several views, a roof rail 20 for a vehicle is generally shown. It should be appreciated that the subject roof rail 20 may be utilized on various vehicles including, but not limited to automobiles and recreational vehicles.

Figure 4:
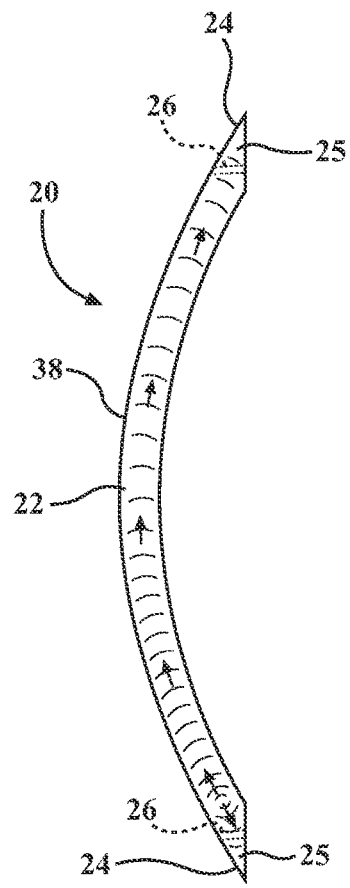
FIG. 4 is a side view of an example roof rail according to an aspect of the disclosure.
Figure 5:
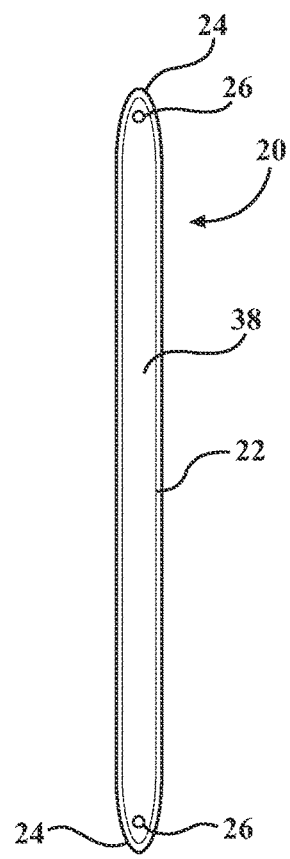
FIG. 5 is a top view of the roof rail of FIG. 1.
Figure 6:
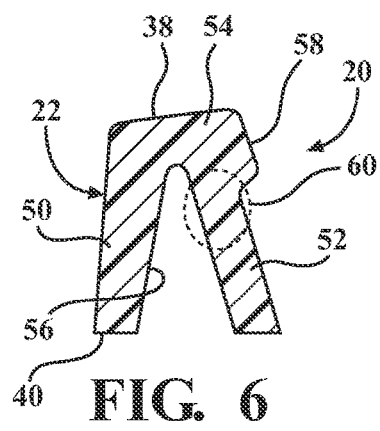
FIG. 6 is a front cross-sectional view of another example roof rail according to another aspect of the disclosure illustrating that the roof rail may have a solid cross-section.
Figure 7:
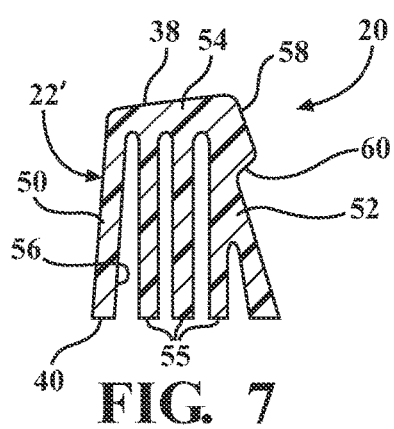
FIG. 7 is a front cross-sectional view of another example roof rail according to another aspect of the disclosure illustrating that the roof rail may have various shaped features.

As illustrated in FIG. 4, the roof rail 20 may include an elongated main body portion 22 that extends between a pair of ends 24. A connecting portion 25 may be defined at each of the ends 24. The connecting portion 25 is the region at which the roof rail 20 is secured to the roof of the vehicle. As illustrated in FIG. 4, the connecting portion 25 may be a region of the roof rail 20 that includes one or more attachment orifices 26 for receiving fasteners, such as bolts, to attach the connecting portion 25 to the roof. The connection portions 25 may also be configured to allow other fastening mechanisms including, but not limited to adhesives and screws, to connect the roof rail 20 to the roof of the vehicle.

According to another aspect of the disclosure, the entire roof rail 20 may be comprised of one solid, integral piece. More specifically, the main body portion 22 and the connecting portions 25 may be integrally connected to one another. The one-piece roof rail 20 may be made of a molded PC/ABS plastic, however various other thermoplastic materials may be used. The one-piece roof rail 20 may have various cross-sectional shapes, however, a generally "R" shape as shown in FIGS. 6-9 and 10A-10B is preferred. It will be appreciated that the roof rail may be formed from a plateable material as discussed herein.

Figure 8:
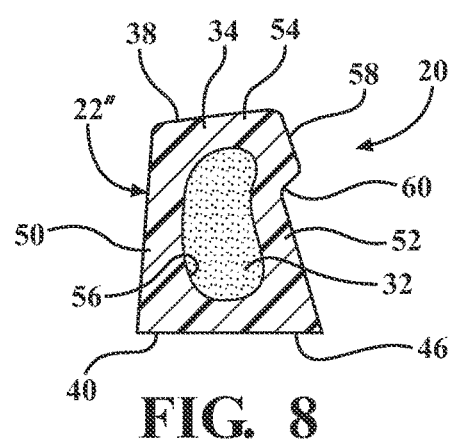
FIG. 8 is a front cross-sectional view of another example roof rail according to an aspect of the disclosure wherein the roof rail is made with a co-injection molding process.

According to another aspect of the disclosure best presented in FIG. 8, a co-injection molding process may be utilized to form the roof rail 20. In such a process, the roof rail 20 may be comprised of an inner portion 32 and an outer portion 34. According to an aspect of the disclosure, such a co-injection molding process may include first injection the material of the outer portion 34 into a mold cavity. Second, the material of the inner portion 32 may be injected into the material of the outer portion 34 inside the same mold cavity. Finally, the material of the outer portion 34 may be injected over the material of the inner portion 32 to seal the material of the outer portion 34 about the material of the inner portion 32. A blowing agent may be utilized during forming of the inner portion 32, which causes small bubbles to be formed in a melt which creates the inner portion 32. This causes a positive cavity pressure to be created within the outer portion 34. Structural inserts may further be utilized in forming the inner portion 32 to meet functional requirements.

According to another aspect of the disclosure, a two-shot injection molding process may be utilized to create the inner portion 32 and the outer portion 34 of the roof rail 20. According to such a process, a first injection nozzle and a second injection nozzle may be provided. The first injection nozzle may be configured to inject a first material to make the inner portion 32, and the second injection nozzle may be configured to inject a second material to make the outer portion 34. A core plate may be initially positioned such that a cavity formed therein is disposed in alignment with the first injection nozzle. The first material may be injected into the cavity to create the inner portion 32. Subsequently, the mold may then opened and the core plate may be moved, e.g., rotated, such that the second injection nozzle is aligned with the cavity. Thereafter, the second material may injected over the first material to form the outer portion 34.

Figure 9:
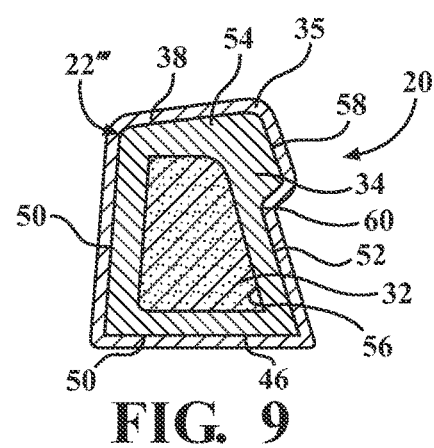
FIG. 9 is a front cross-sectional view of another example roof rail having an outer cladding layer according to an aspect of the disclosure.

An example of a rail 20 made with such a two-shot injection molding process is presented in FIG. 9. The outer portion 34 may be constructed of a plateable material. According to a further aspect, the roof rail may have a decorative metal plating layer 35 disposed on all or part of the outer portion 34 to provide aesthetically pleasing and protective characteristics. The metal plating layer 35 may be constructed from a variety of suitable metals as are known in the art, including, but not limited to chrome, nickel and silver. It should be appreciated that the material of the metal plating layer 35 may be chosen to provide sufficient strength to the roof rail 20 such that fillers like glass do not need to be utilized in the inner and/or outer portion 32, 34. It should further be appreciated that the materials of the inner and outer portion 32, 34 may be chosen such that specific plating processes may be utilized, e.g., the material of the outer portion 34 may be conductive, and the material of the inner portion 32 may be non-conductive to allow an electroplating process to be utilized to dispose the metal plating layer 35 on the outer skin portion 34.

It should be appreciated that the metal plating layer 35 made with the aforementioned two-shot injecting molding process advantageously may eliminate any misconceptions about perceived quality of plastic parts compared to "metallic" parts because the metal plating layer 35 makes the rail 20 cold to the touch, and thick wall stocks give the rail 20 enough weight such that it's not perceived as "cheap plastic." It should also be appreciated that wall thicknesses of the rail 20 can vary depending on the material selection and required strength. A paint or other coating may also be applied to all or part of the outer portion 34 and/or the metal plating layer 35 to provide an added desired aesthetic appearance.

According to another aspect of the disclosure, the inner portion 32 of a rail 20 made with the aforementioned two-shot process may be comprised of one or more structural materials, e.g., reinforced fillers such as glass or carbon fiber. Ideally, a lightweight material is utilized in order to reduce the overall weight of the vehicle.

It should be appreciated that the aforementioned co-injection and two-shot injection molding processes both advantageously provides an outer portion 34 that completely surrounds the inner portion 32 with substantially no gaps between the outer and inner portions 34, 32. This provides a rail 20 that is substantially solid, not cored, and therefore a one-piece unit. It should be appreciated that such a one piece unit design as described provides an aesthetically pleasing appearance with no seam lines or gaps between components on the exposed surface. This is contrary to roof rails produced via conventional "gas assist" technology which have a hollow center.

Figure 10:
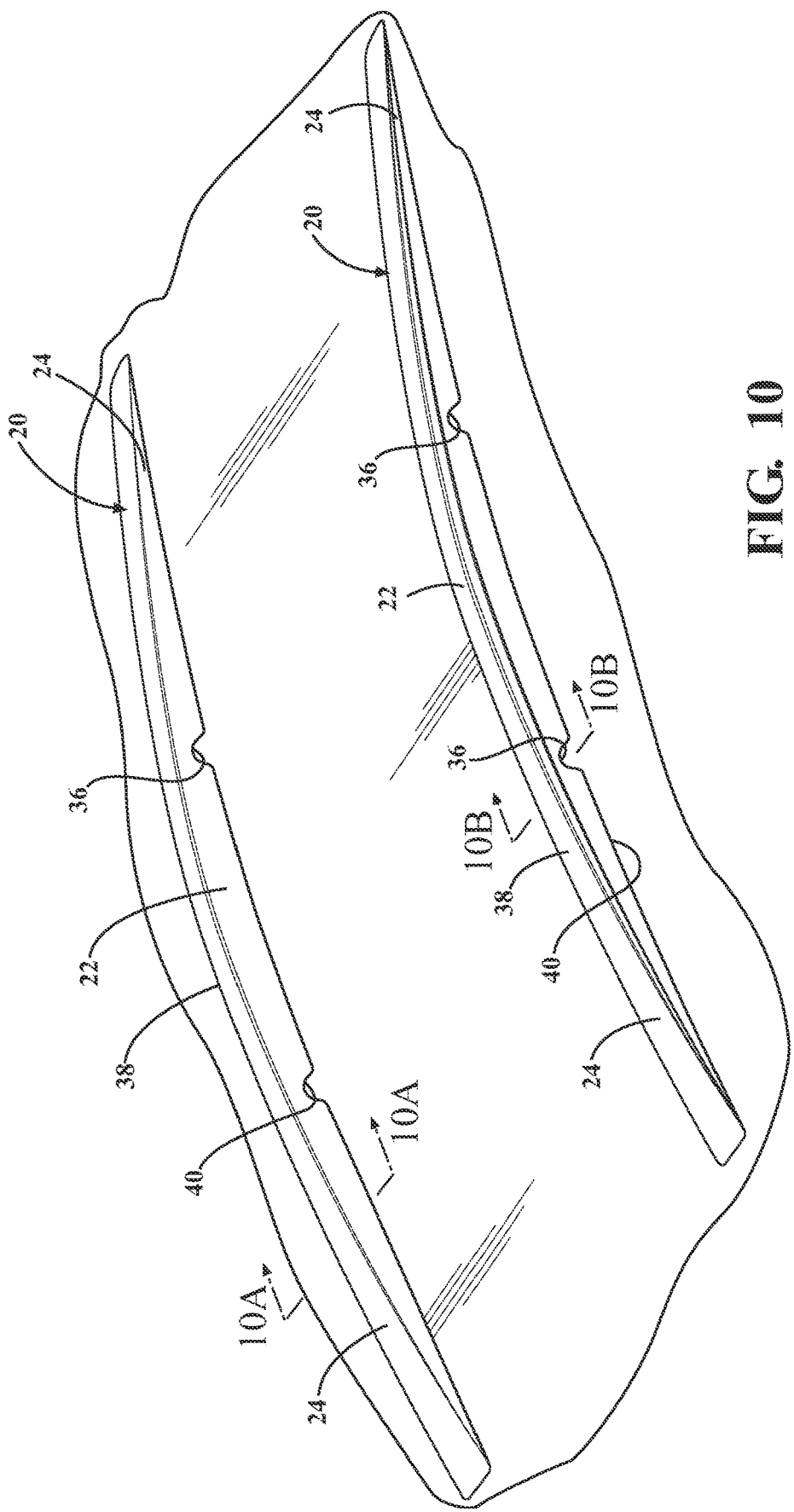
FIG. 10 is a perspective view of another example roof rail having a plurality of tie down slots on a bottom surface thereof.
Figure 11:
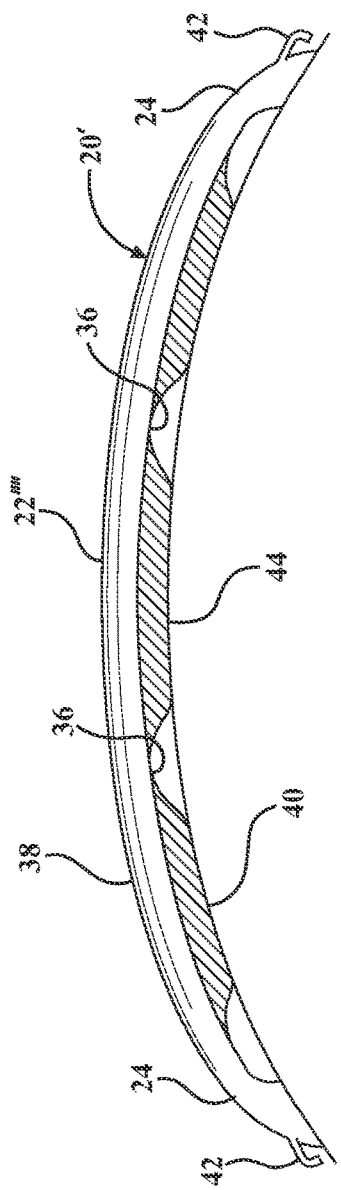
FIG. 11 is a side view of a side view of another example roof rail having a pair of rope hook features at the ends of the rail.

As illustrated in FIGS. 10-11, according to another aspect of the disclosure, the roof rail 20 may include one or more integrated tie down slots 36 which allow a user to tie items to the rails for transportation. The tie down slots 36 can also act as clamping locations for accessory crossbar kits. More particularly, the roof rail 20 may include an upper surface 38 and a lower surface 40 opposite the upper surface 38, wherein the lower surface 40 is for overlying the roof of the vehicle. The upper and lower surfaces 38, 40 form portions of the outer portion of the rail 20. The lower surface 40 may define the tie down slots 36 and they may extend in an upward direction toward the upper surface 38. The roof rail 20 may also include a rope hook 42 at the ends 24 of the roof rails 20. These features allow a user of the vehicle to secure certain types of cargo to the roof without the need for crossbars which add weight and increase wind resistance when installed on the vehicle's roof. It should be appreciated that in both cases where tie down slots 36 and rope hook 42 features are utilized, the cross-section of the rail 20 can be "R" shaped, similar to aluminum stretch-bent rails, as will be discussed in further detail.

According to another aspect of the disclosure that is best illustrated in FIG. 11, in order to minimize rattling and to provide isolation between the rail and sheet metal, the two-shot molding process may be used to incorporate a seal 44 or pad under the bottom surface of the roof rail 20.

According to another aspect of the disclosure, another approach for making a one piece roof rail 20 is to extrude a thermoplastic material. Under such a process, the roof rail 30 may have any cross-section, and multiple materials can be co-extruded for purposes of reinforcement, water/dust management, minimizing rattles and any undesired gaps between the roof rail 20 and the vehicle sheet metal. There are many benefits associated with this approach. From a manufacturing standpoint, the tooling cost for an extrusion die is very low compared to a large injection molding tool. Lead times may be generally short—approximately two weeks compared to approximately 16-20 weeks for a large injection molding tool. An "R" shaped cross-section is very easy to implement in an extrusion die. The extruded thermoplastic design would also have no parting line concerns which are amplified with secondary operations such as chrome plating and painting. During manufacturing, the extruded rail 20 can be cut and bent to various lengths. The rail 20 can also be bent to its finished length. The ends 24 of the rail 20 may be finished to an appropriate shape to fit the vehicle. Additionally, all necessary holes for body attachments and crossbars may be drilled. Another available option during manufacturing is for the rail 20 to be configured such that it is short with a slight bend in it. End supports with matching covers can be assembled to the extruded rail 20 to complete assembly.

Figure 10A:
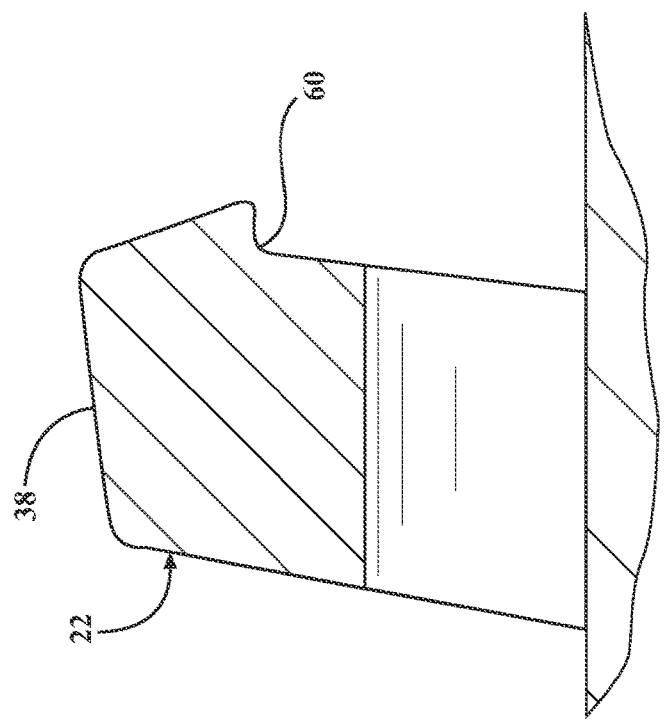
FIG. 10A is a front cross-sectional view of the roof rail of FIG. 10 along a portion of the rail without a tie down slot.
Figure 10B:
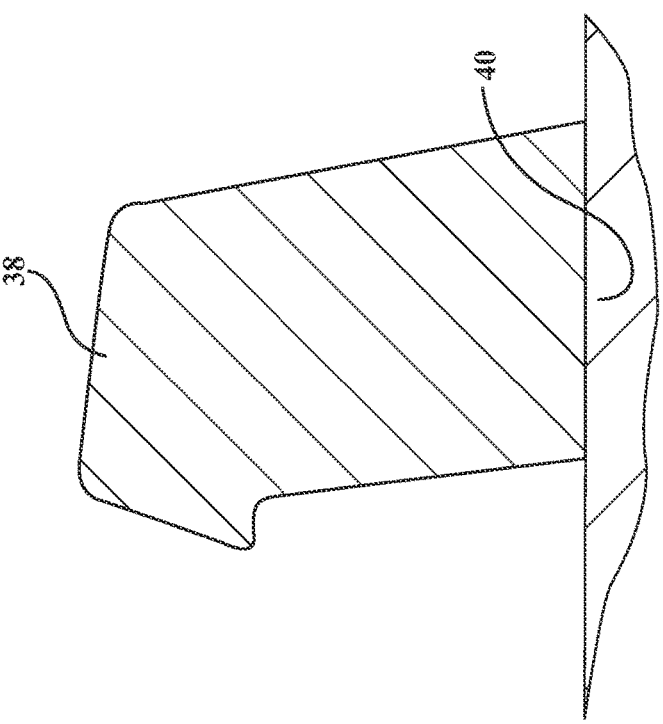
FIG. 10B is a front cross-sectional view of the roof rail of FIG. 10 along a portion of the rail with a tie down slot.

According to another aspect of the disclosure, the "R" shaped cross-section of the main body portion 22, 22', 22", 22'" of the roof rail 20 is best illustrated in FIGS. 3, 6-9 and 10-10B. As shown in these figures, the "R" cross-sectional shape of the roof rail 20 is visible when taken along a plane that extends perpendicularly to the longitudinal length of the roof rail 20. As best shown in FIGS. 6-9, the main body portion 22 may include an elongated back wall 50 and an elongated front wall 52 that extend in spaced relationship with one another. The main body portion 22 may further include a top wall 54 that extends between the back wall 50 and the front wall 52 to define a compartment 56 between the back wall 50, the front wall 52 and the top wall 54. As shown in FIG. 10A-10B, the roof rail 20 may also be of a solid, integrally formed component of one material. Furthermore, as shown in FIGS. 8 and 9, the compartment 56 may be filled with another material, such as through co-injection molding process as described above. As is further shown in FIGS. 8-9, the main body portion 22 may further include a bottom wall 46 extends between the back wall 50 and the front wall 52 in spaced and generally parallel relationship with the top wall 54 to close the compartment 56. As further shown in FIGS. 6-9, the top wall 54 may extend from the back wall 50 to a terminal end 58 that is past the front wall 52, and the front wall 52 may extend at an angle relative to the back wall 50. As a result, a character line 60 (best shown in FIGS. 3 and 6) can be provided between the top wall 54 and the front wall 52 to allow for two or more different high precisions three-dimensional textures to be incorporated in the design which can create the illusion of multiple components as well as complement a design theme throughout the rest of the vehicle. According to another aspect of the disclosure presented in FIG. 7, the rail 20 may include a plurality of support walls 55 that extend downwardly from the top wall 54 and/or front wall 52 to provide for increased structural integrity and weight reduction of the rail 20.

It should be appreciated that making the subject roof rail 20 of one solid piece in accordance with the present disclosure provides robust strength while eliminating the traditional use of mating parts (like the multi-piece roof rail 20 shown in FIG. 1). It should also be appreciated that the subject roof rails 20 has an enhanced appearance because the one-piece, solid structure of the roof rail 20 does not have undesired seam lines or gaps between components, and may easily be coated with aesthetically pleasing, protective materials. The one piece roof rail 20 is also more cost effective and easier to assemble than conventional roof rails due to the fewer number of components. The lack of a cosmetic cover component over the roof rail 20 also eliminates the risk of loose/missing covers which tends to be the main reason for luggage warranty returns. It should also be appreciated that the subject roof rail 20 is light in weight, thus reducing the overall weight of the vehicle.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of forming a roof rail for a vehicle, including:
   injection molding an elongated main body portion extending in a longitudinal direction between a pair of connecting portions each at an end of the main body portion, wherein the roof rail is configured to connect to the vehicle at the connecting portions, wherein the main body portion and the connecting portions are formed as a single unitary one piece component with a single upper surface being substantially continuous in the longitudinal direction, an opposing bottom surface being substantially continuous in the longitudinal direction, and two opposing side surfaces each extending between the upper and bottom surfaces, wherein the side surfaces are each substantially continuous between the upper surface and the bottom surface, and wherein the main body portion and the connecting portions are comprised entirely of a single plateable thermoplastic material with no glass filler;
   wherein the roof rail is solidly filled with the single thermoplastic material an entire distance between the upper and bottom surfaces; and
   electroplating a metal plating layer onto substantially an entirety of the upper surface and sides surfaces of the roof rail to provide an appearance of a metal roof rail.

2. The method as set forth in claim 1, wherein the bottom surface at the connecting portion defines at least one attachment orifice for receiving at least one fastener for fixing the connecting portion to a roof of the vehicle, and wherein the upper surface overlies the attachment orifice such that the attachment orifice is not visible when the roof rail is secured to the vehicle.

3. The method as set forth in claim 1, wherein the bottom surface at the main body portion defines a plurality of tie down slots.

4. The method as set forth in claim 1, wherein at least a portion of the bottom surface at the main body portion of the roof rail is substantially aligned with and along a same radius of curvature as the bottom surfaces at the connecting portions such that the bottom surface at the main body portion is configured to engage the roof of the vehicle flush with the roof of the vehicle.

5. The method as set forth in claim 1, wherein the single thermoplastic material is an acrylonitrile butadiene styrene material.

6. The method as set forth in claim 1, wherein the single thermoplastic material is a polycarbonate/acrylonitrile butadiene styrene material.

7. The method as set forth in claim 1, wherein the upper surface extends from a first side wall of the side walls to a terminal end that is past a second side wall of the side walls to define a character line between the top wall and the second side wall.

8. The method as set forth in claim 1, wherein the main body portion has an R-shaped cross-section.

9. A method of forming a roof rail for a vehicle, including:
   injection molding an elongated main body portion extending between a pair of connecting portions for being connected to the roof to the vehicle;
   wherein the main body portion and the connecting portions are formed as a single unitary one piece component with a single upper surface, a bottom surface opposite and in spaced relationship with the upper surface and two opposing side surfaces extending between the upper and bottom surfaces;
   wherein the upper, bottom and side surfaces are each substantially continuous;
   wherein the main body portion and the connecting portions are comprised entirely of a single plateable thermoplastic material with no glass filler;

wherein the single plateable thermoplastic material solidly fills an entire distance between the upper and bottom surfaces; and electroplating a metal plating layer onto substantially an entirety of the upper surface and the sides surfaces of the main body and connecting portions to provide an appearance of a metal roof rail.

10. The method as set forth in claim 9, wherein the bottom surface at the main body portion defines a plurality of tie down slots.

11. The method as set forth in claim 9, wherein at least a portion of the bottom surface at the main body portion of the roof rail is substantially aligned with and along a same radius of curvature as the bottom surfaces at the connecting portions such that the bottom surface at the main body portion is configured to engage the roof of the vehicle flush with the roof of the vehicle.

12. The method as set forth in claim 9, wherein the single thermoplastic material is an acrylonitrile butadiene styrene material.

13. The method as set forth in claim 9, wherein the single thermoplastic material is a polycarbonate/acrylonitrile butadiene styrene material.

14. The method as set forth in claim 9, wherein the upper surface extends from a first side wall of the side walls to a terminal end that is past a second side wall of the side walls to define a character line between the top wall and the second side wall.

15. The method as set forth in claim 9, wherein the main body portion has an R-shaped cross-section.

\* \* \* \* \*